(12) United States Patent
Fang

(10) Patent No.: US 6,356,471 B1
(45) Date of Patent: Mar. 12, 2002

(54) DYNAMIC FEEDBACK ADAPTIVE CONTROL SYSTEM AND METHOD FOR PARALLELING ELECTRIC POWER SOURCES AND AN UNINTERRUPTIBLE POWER SUPPLY INCLUDING SAME

(75) Inventor: Wendy Xiaowen Fang, Necedah, WI (US)

(73) Assignee: Powerware Corporation, Raleigh, NC (US)

( * ) Notice: Subject to any disclaimer, the term of this patent is extended or adjusted under 35 U.S.C. 154(b) by 0 days.

(21) Appl. No.: 09/612,804

(22) Filed: Jul. 10, 2000

(51) Int. Cl.$^7$ ................................................ H02M 7/00
(52) U.S. Cl. ............................. 363/65; 307/72; 307/82
(58) Field of Search ........................ 363/65, 71; 307/65, 307/72, 75, 82

(56) References Cited

U.S. PATENT DOCUMENTS 5,745,356 A * 4/1998 Tassitino et al. ............... 363/71

* cited by examiner

Primary Examiner—Peter S. Wong
Assistant Examiner—Gary L. Laxton
(74) Attorney, Agent, or Firm—Leydig, Voit & Mayer, Ltd.

(57) ABSTRACT

A connectionless paralleling and load sharing system and method for power sources are presented. The invention provides a dynamic feedback adaptive control system that enables proper load sharing among paralleled power sources without the need for interconnection therebetween. Only the individual source's voltage and current are sensed by its controller. These output parameters are then used to modify a reference voltage used by the controller to control the source's output waveform. This reference voltage compensation is accomplished through two feedback control loops, an outer loop for the voltage compensation and an inner loop for the current compensation. The outer loop includes an integration of the voltage error between the desired voltage and the actual voltage sensed at the source's output. The inner loop is filtered and operates in a proportional fashion to rapidly adjust the output. Through proper constant selection the control system and method of the invention provides load sharing control proportional to an individual source's power supplying capacity, i.e. on a per unit basis. This allows the use of supplies of different rating in a single paralleled environment. This system and method are particularly well suited for systems requiring uninterruptible power supplies.

19 Claims, 2 Drawing Sheets

DYNAMIC FEEDBACK ADAPTIVE CONTROL SYSTEM AND METHOD FOR PARALLELING ELECTRIC POWER SOURCES AND AN UNINTERRUPTIBLE POWER SUPPLY INCLUDING SAME

FIELD OF THE INVENTION

This invention relates generally to the output power control of power supplies, and more particularly to output power control of multiple power supplies coupled in parallel to allow load-sharing therebetween.

BACKGROUND OF THE INVENTION

As more and more segments of the business environment enter the information age, more and more computers and computing power are required. As business move from the old to the new economy their reliance on the processing, transference, and storage of digital information is becoming a more and more critical aspect of their overall business strategy. While in the past, computer crashes were seen as a mere nuisance, the loss of computing power and business data may well devastate a business's ability to survive in today's new economy. As such, the need for reliable, uninterruptible electric power to maintain the operational status of the computing equipment and the integrity of the digital data continues to rise.

To meet these requirements, uninterruptible power supplies (UPS) have been developed. These UPSs utilize a bank of electric storage batteries and solid state conversion equipment in association with the utility line voltage to provide continuous electric power to a businesses computer systems in the event of a loss or deviation of power quality from the utility. The number of batteries contained within an UPS is dependent upon the businesses length of time that it needs to operate in the event of a utility power system failure. Likewise, the number of power modules included in a modular UPS is dependent on the overall total system load required to be supplied thereby. While these new modular UPSs allow a user to increase the power that may be supplied as their needs increases by simply adding additional modules, some businesses may find it necessary to purchase additional UPSs to supply their total power need.

If the outputs from the separate UPSs are electrically isolated from one another, each may supply power to its connected loads without concern for the output power being supplied by other UPSs. However, one of the advantages of the modular UPSs is that the combined power from each of the modules is available to supply the entire system load. This eliminates the need to carefully monitor how much load is connected to each individual unit, since the total system load will be shared by the various power modules. Within a modular UPS this paralleling control is easily accomplished, typically through integrated master/slave controllers contained in the UPS housing. However, such paralleling control for systems that have multiple distributed UPSs (as opposed to a single, modular UPS) present different problems that must be addressed.

As illustrated in FIG. 1, unlike the identical power modules within a modular UPS that may use simple master/slave controllers, the different line impedances $Z_1, Z_2 \ldots Z_n$ that couple the distributed supplies 22, 24, 26 to the various loads 28, 30 makes this simplistic type of control unfeasible. Further, if the system includes supplies of different rating or from different manufactures, the different source impedances also renders this type of control unable to properly maintain parallel load sharing between the sources. Additionally, since there is no standard for this type of paralleled system, different power supply manufactures typically not include the ability to act in a master or a slave supply role anyway. Even if such control were able to adequately load share while operating in parallel, multiple discreet control wires would be required between the supplies 22, 24, 26 to carry the master waveform information. This would greatly increase the cost and complexity of this system, and would reduce its overall reliability.

Other multiple-source paralleling techniques also require that multiple control or sense wires be utilized. One common technique is to place current and voltage sensors at the source terminals and at a point of regulation near the load connections. A complex interconnection of control wires is then used to determine a difference-from-average (DFA) current that is being supplied by each individual supply. This DFA current represents a load sharing unbalance, and is used by the individual supply units to adjust their output regulation to drive the DFA current to zero, thus supplying equal load on each unit.

In addition to the increased cost and complexity of such an arrangement, this type of system does not account for the potential different ability of any one source to supply a given load. That is, each unit will be driven to supply equal load, even if its capacity is less than another unit (due to the use of different rated units in the parallel system). This may cause smaller rated units to fail in situations where the overall paralleled load is well below the combined capacity of the overall system. For example, if a supply rated at 1 kVA and one rated at 5 kVA are paralleled, the total system capacity is 6 kVA. However, if the parallel control system attempts to maintain equal load sharing between supplies, the 1 kVA rated supply will likely fail at connected loads above 2 kVA since its equal share of the load will exceed its rated capacity.

There exists, therefore, a need in the art for a system and method to allow multiple supplies, particularly UPSs, to be paralleled without requiring interconnection of control wiring between units, and to allow load sharing in proportion to the individual supply's power rating.

SUMMARY OF THE INVENTION

To overcome the above described and other problems existing in the art, the system and method of the present invention provide an adaptive feedback control system that enables connectionless parallel operation of two or more power supplies. The power supplies can be any electronic devices with output control loops, such as DC/AC Inverters, UPS (Uninterruptible Power Supply) units, etc. The control system and method of the invention are incorporated within the output controller for each supply, and operates without the requirement of any communication of control or load parameters from any other supply or its controller. Further, the system and method of the invention do not require any difference from average (DFA) current information or any remote point-of-regulation voltage data to maintain proper parallel operation. Unlike prior paralleling and load sharing systems, the system and method of the invention maintains proper load sharing in proportion to the capacity of the individual source, as opposed to as an equal division of the load between the paralleled sources without regard to source capacity.

This new paralleling power supply technology is applied to the output control loop of each power supply. An adaptive output voltage reference, $V_{ref}$, which is the sum of a desired output voltage waveform and a compensator is used to control the output waveform. The compensator utilizes two feedback loops, one for its supply's output current and another for its supply's output voltage, to adaptively modify the normal reference control signal, $V_{ref}$. In this way the system and method of the invention balances currents among and shares load with the other power supply units that are supplying power in the same power supply system. With this dynamic control scheme, a bank of power supplies, such as UPS units, inverters, etc. having different power capabilities, different impedances, different phase controllers, and different harmonic profiles can be paralleled together to supply power to the connected loads without any inter-connection or communication among, these power supplies.

In a preferred embodiment of the invention, the method of controlling an electrical power source, which is in parallel operation with at least one other electrical power source to supply an electrical load, comprises the steps of generating a desired reference voltage signal, sensing an output voltage and an output current generated by the electrical power source, and compensating the desired reference voltage signal with only the sensed output voltage and the sensed output current to maintain proper division of the electrical load on a per unit basis. Preferably, the step of compensating comprises the steps of calculating a difference between a magnitude of the reference voltage signal and the sensed output voltage, integrating the difference, adding a constant selected based on a power capacity of the electrical power source, multiplying this result by the reference voltage signal, and subtracting the sensed output current to develop a compensation signal. This compensation signal is then added to the reference voltage signal.

In an alternate preferred embodiment of the invention, an electrical source is presented that is capable of operating in parallel with other electrical power sources to supply a connected electrical load. This electrical source comprises an output voltage generator producing an output voltage and an output current. It also includes a controller that calculates a reference control signal in a connectionless manner with the other electrical power sources. The reference control signal is used by the output voltage generator to control the output such that the electrical source supplies an amount of the connected electrical load in proportion to a total power capacity of the electrical source itself. Preferably, the controller calculates the reference control signal by sensing only the output voltage and the output current. The controller includes a dynamic feedback adaptive control system that utilizes the output voltage and the output current to compensate a desired voltage reference signal to achieve the reference control signal.

This dynamic feedback adaptive control system includes a slow voltage control loop and a fast current control loop. The slow voltage control loop integrates a difference between the output voltage and the desired voltage reference signal, and the fast current control loop provides proportional compensation that is inversely proportional to the output current. In one embodiment, the slow voltage control loop includes the addition of a constant related to the total power capability of the electrical source. Preferably, the fast current control loop operates to compensate the reference signal due to load unbalances, and the slow voltage control loop operates to minimize compensation of the desired voltage reference signal by the fast current control loop for changes resulting from changes in electrical load.

In yet a further preferred embodiment of the invention, a dynamic adaptive feedback controller for an electrical power source that is capable of supplying electric power in parallel with other power sources to a connected electrical load is presented. This controller comprises a desired reference waveform generator, and an output voltage sense and an output current sense coupled to the output of the electrical power source. This controller utilizes a slow voltage feedback loop and a fast current feedback loop to maintain proper load division on a per unit basis in a connectionless manner with the other power sources. Preferably, the controller calculates a difference between the magnitude of the reference voltage signal and the sensed output voltage, integrates this difference, adds a constant selected based on a power capacity of the electrical power source, multiplies by the desired reference voltage signal, subtracts the sensed output current to develop a compensation signal, and adds the compensation signal to the reference voltage signal to control the output of the electrical power source.

Other objects and advantages of the invention will become more apparent from the following detailed description when taken in conjunction with the accompanying drawings.

BRIEF DESCRIPTION OF THE DRAWINGS

The accompanying drawings incorporated in and forming, a part of the specification, illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENTS

Figure 1:
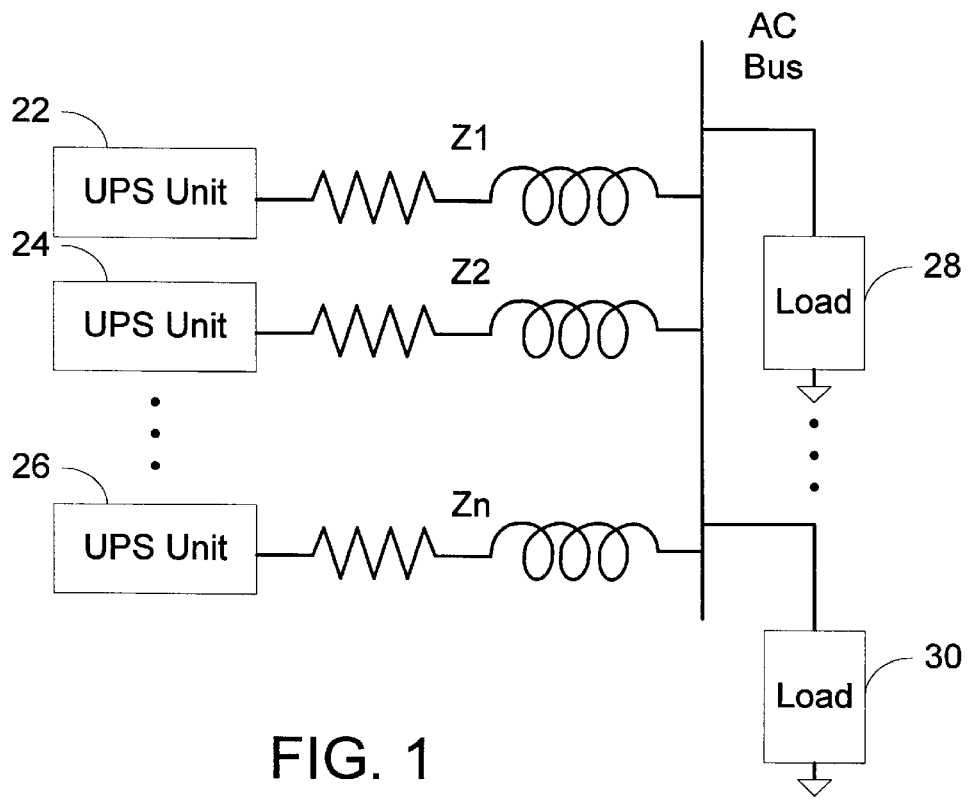
FIG. 1 is a single line electrical schematic illustration of an electric power distribution system having multiple distributed power sources supplying multiple distributed loads.

As introduced above, FIG. 1 illustrates a power distribution system having multiple, distributed power supplies, i.e. uninterruptible power supplies (UPSs) 22, 24, 26, coupled to multiple loads 28, 30 though line impedances $Z_1$, $Z_2$, $Z_3$. These line impedances may be identical, but are more realistically different. Of significance in FIG. 1 is the lack of any control signal interconnection between the UPSs 22, 24, 26 or any distributed current or voltage sensors to maintain parallel operation or load sharing. With the system and method of the invention, there is also no requirement that these UPS units 22, 24, 26 be of identical power capabilities in order to properly share the total system load. This proper load sharing is maintained dynamically during load changes, and regardless of the nature of the load, i.e. resistive, inductive, capacitive, linear, nonlinear, and having continuous or discontinuous characteristics.

The system and method of the invention achieves its wireless parallel operation by recognizing that there are two, and only two, variables or parameters that may be observed from the point of view of the power supply units 22, 24, 26 without external or inter-unit communication. These parameters are the UPS's own output voltage $V_{out}$ and output current $I_{out}$. The other power units' voltages and currents, as well as voltage and current on load or at a point-of-regulation (POR), cannot be obtained by the control loop of the power unit unless inter-connection wiring is added to the system. However, as discussed above this increases the cost and complexity and reduces the reliability of the system.

Figure 2:
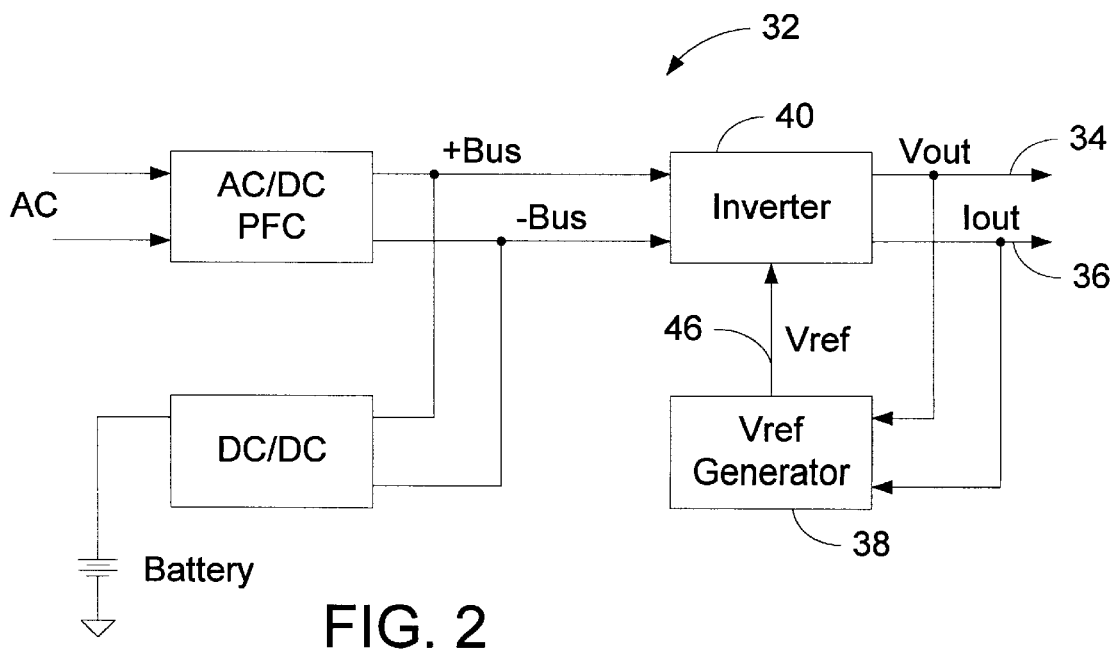
FIG. 2 is a block diagrammatic illustration of an uninterruptible power supply (UPS) constructed in accordance with the teachings of the instant invention.

As illustrated in FIG. 2, the system of the invention, as embodied in an UPS 32, feeds back the output voltage 34 and current 36 to the voltage reference signal generator 38 to modify the reference signal utilized by the inverter 40 to develop the output voltage waveform. This reference signal compensation adjusts the output voltage waveform reference $V_{ref}$ based on its own current and voltage feedback so as to balance currents and share load among the power units in the same power supply system (see FIG. 1). As will be discussed more fully below, this current balancing and load sharing provided by the present invention is preferably accomplished on a per unit capacity basis, as opposed to equality of load between units regardless of capacity as done in prior systems. Of course, the system of the invention will achieve equality of load sharing between units if all the units are of equal capacity.

Figure 3:
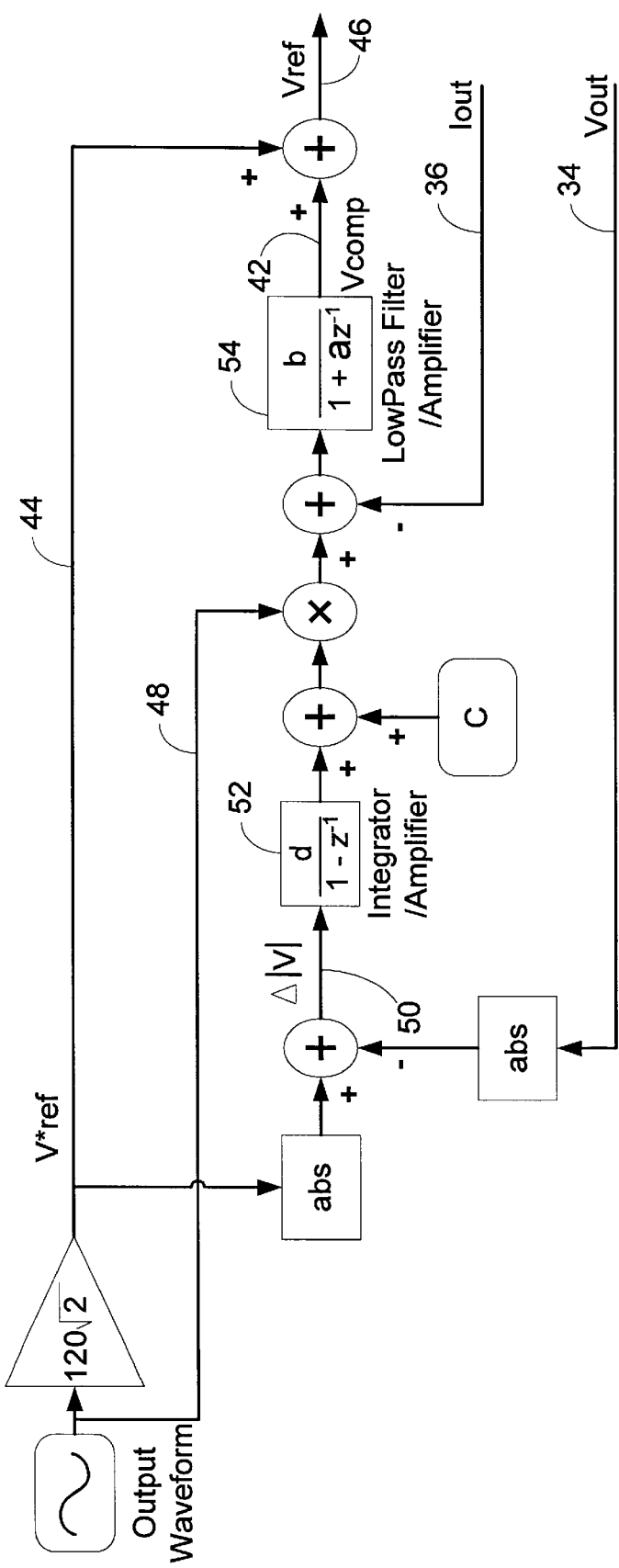
FIG. 3 is a control block diagram illustrating an embodiment of a control system allowing wireless parallel operation constructed in accordance with the teachings of the present invention.

The control system and method of the present invention adds or injects a dynamic signal $V_{comp}$ 42 to the power supply output control loop voltage reference $V^*_{ref}$ 44 as illustrated in FIG. 3. This signal's (42) frequency and amplitude are not fixed, but are dynamically changing to achieve the optimum and robust control performance. As will be made apparent from the following, features of importance provided by this invention are the simplification of its programming, its flexibility for trading off performance requirements among difference specifications, and its robustness for real-life circumstances.

As may be determined from FIG. 3, a general expression for $V_{ref}$ is:

$$V_{ref}(t)=V^*_{ref}(t)+V_{comp}(V^*_{ref}(t), V_{out}(t),I_{out}(t)) \qquad (1)$$

Where $V_{ref}(t)$ 46 is the dynamic adaptive power supply output voltage reference 46; $V^*_{ref}(t)$ 44 is the desired output voltage waveform reference or the ordinary output voltage reference, which can be a sine wave, such as $V^*_{ref}(t)=169*\sin(\omega)$ for a DC/AC inverter 40 (see FIG. 2), or a fixed value, such as $V^*_{ref}(t)=200$ for a 200 VDC output DC/DC converter; $V_{out}(t)$ 34 is the measured power supply output voltage; $I_{out}(t)$ 36 is the measured output current; and $V_{comp}$ 42 is the dynamic adaptive paralleling compensation, which is a function of $V^*_{ref}(t)$, $V_{out}(t)$, and $I_{out}(t)$.

The compensation 42 for the dynamic output voltage reference 46 may be further expressed as follows:

$$V_{comp}(V^*_{ref}(t),\ V_{out}(t),\ I_{out}(t)) = \frac{b}{S+a} * \left[\left(c+\frac{d}{S} * \Delta\bigg|V(t)\bigg|\right) * f_{waveform}(t) - I_{out}(t)\right] \qquad (2)$$

Where $f_{waveform}(t)$ 48 is the time function of the desired output waveform, such as a sine $f_{waveform}(t)=\sin(\omega t)$; $\Delta|V(t)|$ 50 is equal to $|V^*_{ref}(t)|-|V_{out}(t)|$, the difference between the absolute values $V^*_{ref}(t)$ and $V_{out}(t)$; the item 1/s is the integrator 52 of $\Delta|V(t)|$; and the item b/(s+a) 54 is a low pass filter with gain b/a that limits the compensation current loop maximum frequency. The four constant real numbers, a, b, c, and d are selected so as to obtain the optimum paralleling and load sharing performance within the operating power quality standards governing system operation. The selection of these parameters will be discussed in detail below. Equation 2 above may also be expressed in digital form as is illustrated in FIG. 3 as follows:

$$V_{comp}(V^*_{ref}(k),\ V_{out}(k),\ I_{out}(k)) =$$

$$\frac{b}{1+az^{-1}} * \left[\left(c+\frac{d}{1-z^{-1}} * \Delta\bigg|V(k)\bigg|\right) * f_{waveform}(k) - I_{out}(k)\right].$$

As will be realized by one skilled in the art from an analysis of the above equations and FIG. 3, the adaptive $V_{comp}$ 42 is proportional to $\Delta|V(t)|$ 50. As such, $V_{comp}$ will become larger if the absolute value of $V_{out}(t)$ is smaller than that of $V^*_{ref}(t)$, and vice versa. In this way, the actual amplitude of $V_{ref}(t)$ 46 is kept close to $V^*_{ref}(t)$, which is the desired or ideal condition. It may also be observed that the adaptive $V_{comp}$ 42 is inversely proportional to $I_{out}(t)$ 36. As such, $V_{comp}$ 42 decreases if the power supply's output current $I_{out}(t)$ 36 increases, and vice versa. This is the primary mechanism that operates to balance currents within the power supply system.

From a feedback control point of the view, the system of the invention provides two closed control loops to compensate the desired voltage reference 44 to allow connectionless parallel operation. These two closed compensation control loops include an external voltage control loop and an internal current control loop. In the external control loop, as may be seen from FIG. 3, the signal $\Delta|V(t)|$ 50 is integrated 52, which means that $V_{comp}$ 42 is dependent on the integration of $V_{out}(t)$'s feedback error 50. For the internal loop, FIG. 3 makes clear that the contribution of $I_{out}(t)$ 36 to $V_{comp}$ 42 is simply in a proportional feedback relationship. Since the external voltage control loop includes an integration while the internal current control loop is does not, it is clear that internal current loop is much faster then the external voltage loop.

To better understand the operation of the compensation provided by the invention to allow connectionless parallel operation, consider that $I_{out}$ contains two constituent components. The first component, $I_{outl}$, is current from the power supply to the load, and the second component, $I_{outx}$, is current from the power supply to other power supplies in the same system. As such, $I_{out}(t)$ may be expressed as follows:

$$I_{out}(t)=I_{outl}(t)+I_{outx}(t) \qquad (4)$$

When the output current I occurs due to an unbalance or mismatch among power supply units that are operating in parallel, $\Delta|V(t)|$ 50 will experience little if any change since the output voltage $V_{out}$ 34 varies very little because the line impedances are relatively small (as compared to the impedance change resulting from load changes on the system). In this situation the control system and method of the invention causes $V_{comp}$ 42 to move inversely to the change in $I_{out}$ 36. This results in an adjustment to $V_{ref}$ 46 in a direction to cancel this current. In this way, the unbalance between power supplies is eliminated. In an exemplary system having two UPSs, one would increase its output to take more load and the other would decrease its output to give up some load. Together, the two UPSs would move to proper load sharing.

By contrast, when an output current $I_{outl}$ changes due to changing load, the amplitude of the power supply's output voltage $V_{out}$ will also change correspondingly to supply required power. The voltage change will be relatively larger than results from a load sharing unbalance since the impedance of the load is usually significantly greater than the impedance of the line seen due to the unbalance among power supplies. The direction of the load current $I_{out1}$ and the amplitude of $V_{out}$ change in opposite directions, and therefore the contributions of $I_{out1}$ and $\Delta|V(t)|$ to $V_{comp}$ are in opposite direction. Therefore, the overall effect on $V_{comp}$ provided by the system of the invention for this situation will be much smaller than the effect provided by the invention when the current change is a result of a load unbalance. The integrated feedback for $\Delta|V(t)|$ will finally push $\Delta|V(t)|$ closes to zero under the new load or $I_{out1}$.

The low pass filter b/(s+a) provides a pole for the compensation, and is an important factor for the quality of $V_{comp}(t)$. In practical applications $I_{out}(t)$ can contain quite high frequencies that can cause ripple on $V_{ref}(t)$. The low pass filter limits the maximum frequency bandwidth and reduces high frequency effect on $V_{ref}$, while retaining the added component for current balancing and sharing. In this way, the system of the invention provides an adaptive control signal with dynamic amplitude and frequency. The static, steady state gain of the low pass filter, b/a, is the proportional gain of the internal current loop. As this gain is increased, the control responds faster and stronger to $I_{outx}(t)$ to reduced this current unbalance. However, increasing the gain may also introduce more distortion to $V_{ref}$ 46.

Similarly, the constant "d" is the integral gain of the external voltage loop. The larger the value, the faster and stronger $\Delta|V(t)|$ is driven to zero. However, a large "d" will also reduce the effect of that changes resulting from $I_{out}(t)$ will have on $V_{comp}(t)$. Therefore, a large integral gain may result in relatively weak current balancing and sharing performance.

The constant "c" is set corresponding to the power capability of a power supply unit. For example, the constant "c" in a 3 kVA power supply unit will be a half of that for a 6 kVA unit. Power supply units with various power capabilities, by means of setting the constant "c" properly, can work in parallel without interconnection among them and share load according to their individual power capability. For example, in a system with a 1 kVA UPS, a 2 kVA UPS, and a 3 kVA UPS having a 2 kVA connected load, proper selection of the constant "c" will result in the following load sharing: 500 VA or 0.5 pu for the 1 kVA UPS; 1 kVA or 0.5 pu for the 2 kVA UPS; and 1.5 kVA or 0.5 pu for the 3 kVA UPS. As may be seen from this example, the system of the invention provides load sharing on a per unit (pu) basis with the proper selection of the constant "c".

Accordingly, the scope of the invention is only to be limited by the scope of the appended claims.

The foregoing description of various preferred embodiments of the invention has been presented for purposes of illustration and description. It is not intended to be exhaustive or to limit the invention to the precise forms disclosed. Obvious modifications or variations are possible in light of the above teachings. For example, while the invention is described in connection with uninterruptible power supplies (UPSs) and/or DC-to-AC inverters, the techniques of the invention may also be applied to other types of power supplies or systems as well. Also, some additional small circuits can be added into the scheme for noise and disturbance or computational purposes, such as a saturator, a deadband, etc. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of controlling a first electrical power source, the first electrical power source being in parallel operation with at least one other electrical power source to supply an electrical load, the method comprising the steps of:

generating a desired reference voltage signal;

sensing an output voltage generated by the first electrical power source;

sensing an output current generated by the first electrical power source; and compensating the desired reference voltage signal with an integration of the sensed output voltage and a proportion of the sensed output current to maintain proper division of the electrical load on a per unit basis.

2. A method of controlling a first electrical power source, the first electrical power source being in parallel operation with at least one other electrical power source to supply an electrical load, the method comprising the steps of:

generating a desired reference voltage signal;

sensing an output voltage generated by the first electrical power source;

sensing an output current generated by the first electrical power source; and compensating the desired reference voltage signal with only the sensed output voltage and the sensed output current to maintain division of the electrical load on a per unit basis; and wherein the step of compensating comprises the steps of:
calculating a difference between a magnitude of the reference voltage signal and the sensed output voltage;
integrating the difference;
adding a constant selected based on a power capacity of the first electrical power source;
multiplying a result of said step of adding by the reference voltage signal;
subtracting the sensed output current to develop a compensation signal; and
adding the compensation signal to the reference voltage signal.

3. The method of claim 2, wherein the step of compensating further comprises the step of low pass filtering the compensation signal.

4. A method of controlling an electrical power source, the electrical power source being in parallel operation with at least one other electrical power source to supply an electrical load, the method comprising the steps of:

generating a desired reference voltage signal;

sensing an output voltage generated by the electrical power source;

sensing an output current generated by the electrical power source; and compensating the desired reference voltage signal with only the sensed output voltage and the sensed output current to maintain proper division of the electrical load on a per unit basis; and wherein the step of compensating comprises the step of calculating a compensated reference signal to control the output of the electrical power source in accordance with the following equation:

$$V_{comp}(V^*_{ref}(k),\ V_{out}(k),\ I_{out}(k)) =$$

$$\frac{b}{1+az^{-1}} * \left[\left(c + \frac{d}{1-z^{-1}} * \Delta\left|V(k)\right|\right) * f_{waveform}(k) - I_{out}(k)\right].$$

5. A method of controlling an electrical power source, the electrical power source being in parallel operation with at least one other electrical power source to supply an electrical load, the method comprising the steps of:

generating a desired reference voltage signal;

sensing an output voltage generated by the electrical power source;

sensing an output current generated by the electrical power source; and compensating the desired reference voltage signal with only the sensed output voltage and the sensed output current to maintain proper division of the electrical load on a per unit basis; and wherein said step of compensating comprises the step of utilizing a fast current compensation loop and a slow voltage compensation loop.

6. The method of claim 5, wherein said fast current compensation loop is a proportional control loop.

7. The method of claim 6, wherein said fast current compensation loop compensates the desired reference voltage signal in inverse proportion to the sensed output current.

8. The method of claim 5, wherein said slow voltage compensation loop compensates the desired reference voltage signal in proportion to an integral difference between the sensed output voltage and the desired reference voltage signal.

9. The method of claim 8, wherein said slow voltage compensation loop further compensates the desired reference voltage signal based on a power capacity of the power source.

10. The method of claim 5, wherein said fast current compensation loop adjusts the desired reference voltage signal due to current changes resulting from load unbalance among electrical power sources.

11. The method of claim 10, wherein said slow voltage compensation loop minimizes an amount of compensation provided by said fast current compensation loop for current changes resulting from changes in the electrical load.

12. An electrical source capable of operating in parallel with other electrical power sources to supply a connected electrical load, comprising:

an output voltage generator producing an output voltage and an output current; and a controller calculating a reference control signal in a connectionless manner, the reference control signal used by the output voltage generator to control the output such that the electrical source supplies an amount of the connected electrical load in proportion to a total power capacity of the electrical source, said controller further calculating said reference control signal by sensing only said output voltage and said output current, said controller including a dynamic feedback adaptive control system utilizing said output voltage and said output current to compensate a desired voltage reference signal to achieve said reference control signal; and wherein said dynamic feedback adaptive control system includes a slow voltage control loop and a fast current control loop, said slow voltage control loop integrating a difference between said output voltage and said desired voltage reference signal, and said fast current control loop providing proportional compensation that is inversely proportional to said output current.

13. The electrical source of claim 12, wherein said slow voltage control loop includes the addition of a constant related to the total power capability of the electrical source.

14. The electrical source of claim 12, wherein said fast current control loop operates to compensate said reference signal due to load unbalances, and wherein said slow voltage control loop operates to minimize compensation of the desired voltage reference signal by said fast current control loop for changes resulting from changes in electrical load.

15. An electrical source capable of operating in parallel with other electrical power sources to supply a connected electrical load, comprising:

an output voltage generator producing an output voltage and an output current; and a controller calculating a reference control signal in a connectionless manner, the reference control signal used by the output voltage generator to control the output such that the electrical source supplies an amount of the connected electrical load in proportion to a total power capacity of the electrical source, said controller further calculating said reference control signal by sensing only said output voltage and said output current, said controller including a dynamic feedback adaptive control system utilizing said output voltage and said output current to compensate a desired voltage reference signal to achieve said reference control signal; and wherein said dynamic feedback adaptive control system calculates said reference control signal in accordance with the following equation:

$$V_{comp}(V^*_{ref}(k),\ V_{out}(k),\ I_{out}(k)) =$$

$$\frac{b}{1+az^{-1}} * \left[\left(c + \frac{d}{1-z^{-1}} * \Delta\left|V(k)\right|\right) * f_{waveform}(k) - I_{out}(k)\right].$$

16. The controller of claim 15, wherein the controller calculates a difference between a magnitude of the reference voltage signal and a sensed output voltage, integrates this difference, adds a constant selected based on a power capacity of the first electrical power source, multiplies by the desired reference voltage signal, subtracts a sensed output current to develop a compensation signal, and adds the compensation signal to the reference voltage signal to control the output of the first electrical power source.

17. The controller of claim 16, wherein the controller further low pass filters the compensation signal.

18. The controller of claim 16 wherein the controller calculates a compensated reference signal to control the output of the first electrical power source in accordance with the following equation:

$$V_{comp}(V^*_{ref}(k),\ V_{out}(k),\ I_{out}(k)) =$$
$$\frac{b}{1+az^{-1}} * \left[\left(c + \frac{d}{1-z^{-1}} * \Delta\left|V(k)\right|\right) * f_{waveform}(k) - I_{out}(k)\right].$$

19. A dynamic adaptive feedback controller for a first electrical power source, the first electrical power source being capable of supplying electric power in parallel with at least one other at least one power sources to a connected electrical load, comprising:

a desired reference waveform generator;

an output voltage sense circuit coupled to an output of the first electrical power source;

an output current sense circuit coupled to the output of the first electrical power source; and wherein the controller utilizes a slow voltage feedback loop and a fast current feedback loop to maintain load division on a per unit basis in a connectionless manner with the at least one other power sources.

* * * * *

UNITED STATES PATENT AND TRADEMARK OFFICE
CERTIFICATE OF CORRECTION

PATENT NO.   : 6,356,471 B1
DATED        : March 12, 2002
INVENTOR(S)  : Wendy Xiaowen Fang It is certified that error appears in the above-identified patent and that said Letters Patent is hereby corrected as shown below:

Column 8,
Line 11, should read as follows:
--   1.   A method of controlling first electrical power source, the first electrical power source being in parallel operation with at least one other electrical power source to supply an electrical load, the method comprising the steps of:
  generating a desired reference voltage signal;
  sensing an output voltage generated by the first eletrical power source;
  sensing an output current generated by the first electrical power source; and
  compensating the desired reference voltage signal with an integration of the sensed output voltage and a proportion of the sensed output current to maintain division of the electrical load on a per unit basis. --

Signed and Sealed this

Twenty-seventh Day of August, 2002

Attest:

Attesting Officer

JAMES E. ROGAN
*Director of the United States Patent and Trademark Office*